United States Patent [19]

Pollart et al.

[11] Patent Number: 5,118,747
[45] Date of Patent: Jun. 2, 1992

[54] MICROWAVE HEATER COMPOSITIONS FOR USE IN MICROWAVE OVENS

[75] Inventors: Kenneth A. Pollart; Terrence P. Lafferty, both of Neenah, Wis.

[73] Assignee: James River Corporation of Virginia, Richmond, Va.

[21] Appl. No.: 536,212

[22] Filed: Jun. 11, 1990

Related U.S. Application Data

[63] Continuation-in-part of Ser. No. 239,544, Sep. 1, 1988, Pat. No. 5,002,826.

[51] Int. Cl.⁵ .......................... C08K 3/08; C08K 3/18; C08K 3/36
[52] U.S. Cl. .............. 524/424; 219/10.55 E; 252/503; 252/506; 252/508; 252/511; 426/241; 426/243; 524/425; 524/439; 524/440; 524/441; 524/444; 524/445
[58] Field of Search ............... 524/425, 439, 441, 445, 524/495, 496, 424, 435, 437, 440, 444, 543; 252/503, 506, 508, 510, 511, 512, 513, 572; 426/107, 241, 243; 219/10.55 E

[56] References Cited

U.S. PATENT DOCUMENTS

| | | | |
|---|---|---|---|
| 4,190,757 | 2/1980 | Turpin et al. | 219/10.55 E |
| 4,283,427 | 8/1981 | Winters et al. | 426/107 |
| 4,518,651 | 5/1985 | Wolfe, Jr. | 428/308.8 |
| 4,765,929 | 8/1988 | Shaffer | 252/511 |
| 4,864,089 | 9/1989 | Tighe et al. | 219/10.55 E |
| 4,904,836 | 2/1990 | Turpin et al. | 219/10.55 E |
| 4,917,748 | 4/1990 | Harrison | 156/230 |
| 4,943,456 | 7/1990 | Pollart et al. | 428/34.3 |
| 4,970,358 | 11/1990 | Brandberg et al. | 219/10.55 F |
| 4,972,058 | 11/1990 | Benson et al. | 219/10.55 E |
| 4,982,064 | 1/1991 | Hartman et al. | 219/10.55 E |
| 5,002,826 | 3/1991 | Pollart et al. | 428/323 |

*Primary Examiner*—George F. Lesmes
*Assistant Examiner*—Christopher Brown
*Attorney, Agent, or Firm*—Stanley M. Teigland; Thomas H. Whaley

[57] ABSTRACT

Microwave interactive coating compositions are disclosed which comprise finely divided carbon, a powdered inert solid and a binder. A preferred composition comprises finely divided carbon, finely divided microwave reactive metal, powdered inert material and a dielectric binder, preferably an acrylic latex. These compositions are capable of producing microwave reactive heaters comparable to those produced by vapor deposition of metals on a carrier film.

5 Claims, 1 Drawing Sheet

MICROWAVE HEATER COMPOSITIONS FOR USE IN MICROWAVE OVENS

This application is a continuation-in-part of copending U.S. patent application Ser. No. 239,544 filed Sep. 1, 1988 now U.S. Pat. No. 5,002,826.

This invention relates to improvements in microwave interactive compositions and microwave interactive coatings.

The cooking of food and heating of other microwave interactive substances by microwave radiation has become increasingly popular and important in recent years because of its speed, economy, and low power consumption. One of the major drawbacks of microwave ovens for preparation of foods has been their inability to brown or sear the food product to make it similar in taste and appearance to conventionally cooked food. Crisping of certain foods, e.g., the crusts of pies or pizzas, or the surface of fish fillets, potato cakes, or the like, may be accomplished only by means of special packages or utensils.

Several methods have been attempted in the prior art to overcome the browning and crisping problems. One such method for browning or crisping foods or for concentrating heat to produce superelevated temperatures in selected areas of packages involves the use of a metallized coating on paperboard. In some instances, metal particles are vacuum deposited onto a film, preferably a polyester film and the metallized film then laminated onto paper or paperboard. The thus metallized paper or paperboard can then be used in a microwave oven to heat, brown or sear food items placed on the metallized paperboard or in packages comprising metallized paperboard. While such structures can be very effective as heaters, the vacuum deposition process does not readily lend itself to coating selected areas of the film or the application of varying amounts of metal particles or metallized coating to selected areas of the finished carton or structure.

Other methods of forming microwave responsive heating elements involve dispersing particles which are lossy microwave energy absorbers, e.g. carbon, metals, and metal alloys, in a binder and forming a sheet or laminate comprising the dispersed particles. Turpin, U.S. Pat. No. 4,190,757 discloses heaters which comprise a layer of particulate lossy materials, e.g. carbon, iron and various metal oxides, or alloys, in an inorganic binder, e.g. sodium silicate. Balla U.S. Pat. No. 4,264,668 discloses a heating element made up of a layer of carbon black in an acrylate binder laminated between a carrier layer, e.g. paper, cardboard or plastic material, and an outer layer of thermoplastic material. European Patent Application Publication No. 242,952 discloses a heating element made up of a metal or metal alloy in flake form in a thermoplastic dielectric matrix on a dielectric substrate.

SUMMARY OF THE INVENTION

The present invention provides an improved microwave interactive composition which may be coated or printed onto a substrate and which overcome problems inherent in prior art coatings. The composition can be printed in various coating patterns and coating thicknesses using conventional printing or coating processes. The compositions also make possible relatively precise control of heating temperatures and are useful in a wide variety of applications.

A preferred embodiment of the present invention includes microwave interactive coating compositions containing a microwave reactive material comprising carbon, at least one finely divided metal or metal oxide, a powdered solid temperature moderator, and a binder in a suitable carrier liquid. Other embodiments of the invention include a microwave interactive structure comprising a substrate suitably paper, coated with a composition consisting essentially of finely divided carbon, at least one flaked or powdered metal component, a solid temperature moderator, and a dielectric organic solid binder.

Other, less preferred, embodiments of this invention include compositions consisting essentially of microwave reactive metal particles, finely divided carbon, and a binder. Another of the less preferred embodiments of this invention comprises compositions consisting essentially of carbon black, a powdered solid temperature moderator, and a binder.

In a preferred embodiment of the invention, the microwave interactive composition is coated directly onto paper or paperboard. Alternatively, the coating composition may be applied to a film which is then laminated to paper or paperboard. In accordance with a preferred embodiment, a microwave heating element is produced by printing or coating paper or paperboard, or a heat stable polymeric film, with a fluid composition comprising high surface area finely divided carbon, at least one finely divided metal or metal compound, a finely divided inert solid temperature moderator, and a binder.

DETAILED DESCRIPTION OF THE INVENTION

Figure 1:
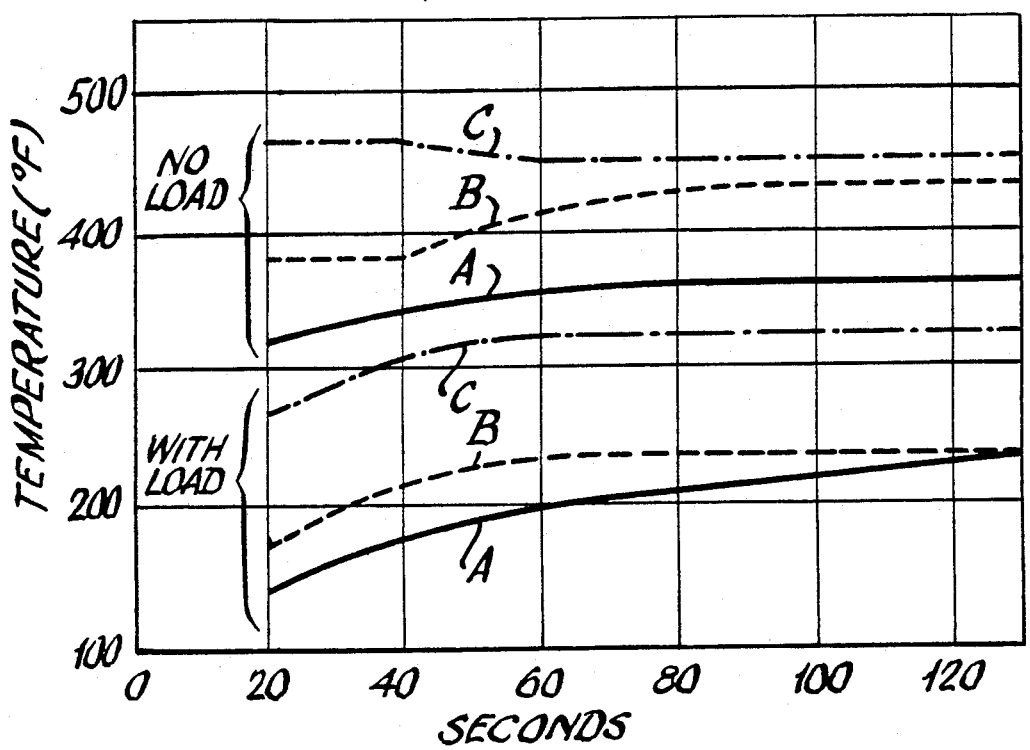
FIG. 1 of the drawing illustrates graphically the heating response obtained with heating elements produced from a preferred embodiment of the microwave interactive composition of this invention.

Microwave reactive materials (MRM) are capable of converting microwave energy to heat. The microwave reactive materials included within the scope of this invention are carbon in the form of carbon black or powdered graphite, and a finely divided metal component, e.g. aluminum, tin, bronze, nickel, and the like, which are conductive or semiconductive or ferromagnetic materials capable of converting microwave radiation energy to heat. The inert powdered solid temperature moderators suitable for use in these formulations include clays, e.g., kaolin and English china clays, alumina, alumina hydrate (aluminum hydroxide), aluminosilicates, silica, including colloidal silica calcium carbonate, titanium dioxide, and the like. The temperature moderator should be essentially inert and substantially unresponsive or only mildly responsive to microwave radiation. Preferred binders comprise synthetic resins in a suitable vehicle; especially preferred binders include polymer latex formulations marketed for this purpose.

The relative proportions by weight of carbon to metal in the composition may be within the range of from about 0.5:1 to about 5:1 with a preferred range of from about 0.7:1 to 3:1. The content of the inert temperature moderator ingredient, e.g. clay, in the composition may range from about 10 percent by weight of the total (dry basis) weight to about 35 percent. As the content of the temperature moderator is increased it is possible to produce heaters with increasingly higher temperature responses with a heat absorbent load without experiencing ignition of the paper or paperboard substrate when placed in a microwave oven without a load. A load is defined herein as the food, water, or other material normally present during microwave exposure. The relative proportions of binder solids to the remaining solids making up the coating may be in the range of from about 0.15:1 to 1.8:1. However, as the binder level is increased, the temperature response of the microwave interactive coating is reduced significantly, both with and without a load. It is preferred to use only enough binder to adequately bond the coating pigments (the other solids) to the substrate. With paper or polyester film as the substrate, a binder solids content in the range of from about 30 to about 40 weight percent of the total coating is preferred. While latex formulations are preferred as binders, a non-aqueous solvent formulation with a binder, such as the product marketed by Morton Chemical Company under the trade name Morez 100, also has been found suitable for use.

As illustrated in the specific examples in this patent application, the type and amount of microwave reactive materials contained in the coating composition largely determines the degree of interaction with the microwaves and hence the amount of heating generated. In a preferred embodiment of this invention, the amount of heat generated is a function of the relative proportion of the coating components and the thickness of the coating on the substrate.

In a preferred embodiment of this invention the microwave reactive material is carbon combined with a metal component. Various metals, metal alloys, and metal compounds in fine particle form are known microwave reactive materials. Microwave reactive metals preferred in this invention include aluminum, iron, nickel, copper, tin, and silver. The metal component may be in powder form, flake form or any other finely divided form suitable for use in coating and printing processes.

In the preferred embodiment of this invention, the microwave reactive material is one which is suitable for use in food packaging and is normally separated from contact with the food by paper or paperboard or by a thermally stable film, e.g. a biaxially oriented polyethylene terephthalate.

It is preferred that the reactive composition demonstrate rapid heating to a desired temperature, with subsequent leveling off of the temperature, and without igniting or destroying the substrate upon exposure to microwave radiation in the absence of a load. The temperature at which the microwave reaction material levels off is hereinafter referred to as the operating temperature. Generally, the microwave reactive material will operate at a temperature ranging from about 275° to about 480° F.

The microwave reactive components and inert material are combined with a binder to form a coating composition. The binder used in this invention may comprise an aqueous or non-aqueous solution or dispersion of a polymer precursor that can be used as a vehicle for the powdered solid components, particularly those which are suitable for use in a printing ink or printing process. The binder must have good thermal resistance and suffer little or no chemical degradation at the temperatures generated by the microwave heating process. The binder must also have an adhesive ability which will allow it to bind the particles together and adhere the composition to the substrate, preferably paper or paperboard or an oriented film.

Preferred binders for the present invention may be selected from water based emulsion polymers, including acrylic latex emulsions, and non-aqueous solvent systems as above mentioned.

The binder and the powdered solid microwave reactive components are combined in suitable relative proportions such that the microwave reactive solids, in the form of a relatively thin coating on the substrate will raise the temperature of a load, e.g. a food item, to the desired level in a reasonable amount of time. The amount of dielectric components must also be sufficient to prevent arcing of the microwave reactive components in the heating element. The heating element may comprise a part or parts of a food package or container, or may consist of a separate heater which may be included in or used in conjunction with a food container or package. The heater may comprise a component of other structures unrelated to food processing where rapid controlled heating by microwave energy is desirable.

Preferably only enough binder is used to adequately bond the solid coating components to one another and to the substrate. As the ratio of the binder to microwave reactive material, on a solids basis, is increased, the temperature of the microwave reactive coating is significantly reduced, both with and without a load. In a preferred embodiment, where the microwave reactive material is a mixture of carbon black and aluminum flake with clay as a moderator and the binder is an acrylic emulsion, the pigment to binder solids ratio, on a weight basis, should be about 4:1 or lower. The ratio of carbon black to aluminum flake usually will be in the range of from about 5:1 to 0.5:1 depending on coating thickness and desired heat response.

Other materials can be included in the coating composition, such as surfactants, dispersion aids and other conventional additives used in coating and printing compositions to facilitate application of the coating composition to the substrate by rotogravure or other suitable printing or coating methods. The coating can be applied using conventional printing and coating processes, e.g., rotogravure, silk screen, flexography, air knife, roll, blade, etc. After the coating composition has been applied it can be dried using conventional drying ovens normally provided in web printing and coating processes.

Theoretically, any amount of coating can be used in the present invention. In a preferred embodiment, when the coating material is a mixture of aluminum flake and carbon black admixed with clay and binder solids, the amount of coating will range from about 0.5 to about 20 pounds per 3000 sq. ft. ream depending on the composition and the desired temperature required for a particular application. The coating composition can generally be coated upon any substrate, especially flexible materials, eg. paper, paperboard, nonwovens, or any suitable film material. Substrates including various uncoated, clay coated, grease proof and parchment papers and polyester films have been successfully used as substrates in our process.

A desirable feature for the microwave reactive coatings is that the coating should have a heating response which results in rapid heating of the load in response to microwave radiation so that the temperature of the coating rises rapidly and then remains at a constant level. It is desirable also, for the temperature of the coating to be self limiting in the absence of a load to avoid ignition of the substrate. These desirable features are accomplished by the composition of our invention as will be apparent from the accompanying specific examples.

The advantages of the process of this invention result from the ability of the compositions to provide microwave interactive coatings on paper or paperboard by conventional coating or printing processes. The coatings can be applied in various patterns and in varying amounts using conventional printing and coating techniques at precise locations on the substrate. Such precise control of amounts of a microwave interactive coating composition applied to a predetermined part of a substrate is not possible with present vacuum metalization coating methods. Coatings of different thickness can be applied simultaneously. Such non-uniform coatings are useful for heating foods which require different levels of temperature and which are contained in the same paper or paperboard container. Printing processes require fewer steps, are more continuous processes and avoid the need for multiple steps involved in the metallization of film and lamination of the metallized film to a substrate.

The following examples of test results demonstrate particular embodiments of this invention and some of the possible variations in compositions and coatings which may be adapted to varying consumer product needs.

In the following examples, all coating formulations were applied to a 40 lb/3000 sq. ft. uncoated, bleached kraft paper with a Bird applicator and dried on a photo drier at 200° F. Unless otherwise specified, the binder used was a combination of Rhoplex B-15, an acrylate latex supplied by Rohm & Haas Company and Lucidene 602, a styrene/acrylic latex supplied by Morton Chemical Company and commonly used in aqueous printing inks. In all cases the carbon black was dispersed (using a shot mill) into part or all of the Lucidene 602 binder being used in the formulation with additional water added as necessary to obtain the desired viscosity. After the carbon black was uniformly dispersed, it was transferred to a container equipped with a propeller type mixer. The remaining binder (Lucidene 602 and/or Rhoplex B-15) as well as the remaining components were gradually added along with additional water as needed. In each case, agitation was continued until a uniform mixture was obtained. The heater response of these coatings was determined by placing a 4 inch by 5.5 inch sample of the coated paper with its short edges taped to a 6 inch by 6 inch sample of 150 lb/3000 sq. ft. paperboard in a Litton microwave oven (Model 2238, 700 watt rating). The sample was supported 2 inches off the bottom of the oven with a glass ring and the temperature response was measured with a Hughes Probeye Thermal Video System.

EXAMPLE 1

A coating composition was prepared as described above with 65 weight percent Huber Arosperse 47 carbon black, 12 weight percent Lucidene 602 and 23 weight percent Rhoplex B-15 (based on the weight of the binder solids). Paper coated with this composition was tested under the conditions described above with the results shown in Table I.

TABLE I

| | Coat Wt. lb/rm | | Heater Response in Degrees F. | | | | |
|---|---|---|---|---|---|---|---|
| | Total | Active[1] | 20 sec | 40 sec | 60 sec | 90 sec | 130 sec |
| No Load | 2.0 | 1.3 | 387 | ign[2] | — | — | — |
| With Load | 2.0 | 1.3 | 225 | 279 | 279 | 306 | 306 |

[1] Active ingredient, i.e. carbon black
[2] Paper substrate ignited

These tests demonstrate that it is very difficult to control the heating response with a carbon coating. Coat weights with as little as 2 lb/3000 sq. ft. will cause the paper to ignite in less than 40 seconds when exposed to microwaves with no load present. With a 200 g water load in the oven, the coating surface heated to only 279°–306° F. We have observed that almost any coating of this type (carbon black or graphite +binder) capable of producing an acceptable heating response with a 200 g water load will ignite a paper or paperboard substrate under no load conditions.

EXAMPLE 2

Coating compositions were made up of 64 weight percent (based on the dry weight of the solids) of aluminum flake marketed under the trade name Hydrolac W60 by Obron Corporation in a binder of 1 part Lucidene 602 and 2 parts Rhoplex B-15 by weight. Paper test sheets coated with varying amounts of the composition were tested as in Example 1 with the results shown in Table II.

TABLE II

| | Coat Wt. lb/rm | | Heater Response in Degrees F. | | | | |
|---|---|---|---|---|---|---|---|
| | Total | Active[1] | 20 sec | 40 sec | 60 sec | 90 sec | 130 sec |
| No Load | 5.7 | 3.6 | 280 | 280 | 280 | 280 | 306 |
| | 17.5 | 11.2 | ign[2] | — | — | — | — |
| With Load | 5.7 | 3.6 | 120 | 140 | 140 | 140 | 160 |
| | 17.5 | 11.2 | 333 | 387 | 414 | 441 | 468 |

[1] Active ingredient, i.e. aluminum flake
[2] Paper substrate ignited

It will be observed that coatings produced from aluminum flake in a binder are relatively ineffective heaters. At the lower coat weights, such as 5.7 lb/3000 sq. ft., the samples do not ignite when placed in a microwave oven with no load but with a 200 g water load the heater response is only 140°–160° F. When the coat weight is increased enough to provide a good heater response with a load, for example 17.5 lb/3000 sq. ft., the coated paper sheet will ignite when placed in the microwave oven with no load.

EXAMPLE 3

A composition was prepared in accordance with this invention from carbon black, finely divided aluminum flake and kaolin clay dispersed in a mixture of one part by weight Lucidene 602 and two parts Rhoplex B15 by weight based on their resin solids content which supply the binder material. The compositions contained 19 weight percent carbon black marketed under the trade name Arosperse 47 by the Huber Corporation; 35 weight percent aluminum flake marketed by Obron Corporation under the trade name Hydrolac W60; 18 weight percent Georgia Kaolin, Premier No. 1 grade;

and 33 weight percent (basis resin solids) of a 1:2 mixture of Lucidene 602 and Rhoplex B15.

Test sheets of coated paper with coating weights in the range of 3.9 to 10 pounds per 3000 square feet were tested as in Examples 1 and 2 with the results shown in Table III, and in FIG. 1 of the drawing.

TABLE III

|  | Coat Wt. lb/rm | | Heater Response in Degrees F. | | | | |
| --- | --- | --- | --- | --- | --- | --- | --- |
|  | Total | Active[1] | 20 sec | 40 sec | 60 sec | 90 sec | 130 sec |
| No Load | 3.9 | 1.9 | 320 | 340 | 347 | 362 | 362 |
|  | 5.0 | 2.5 | 387 | 387 | 412 | 437 | 437 |
|  | 6.7 | 3.3 | 468 | 468 | 441 | 441 | 441 |
|  | 10.0 | 4.9 | 484 | ign[2] | — | — | — |
| With Load | 3.9 | 1.9 | 140 | 180 | 200 | 220 | 240 |
|  | 5.0 | 2.5 | 180 | 220 | 240 | 240 | 240 |
|  | 6.7 | 3.3 | 281 | 303 | 325 | 325 | 325 |
|  | 10.0 | 4.9 | 400 | 428 | 428 | 456 | 428 |

[1] Active ingredients, i.e. carbon black and aluminum flake
[2] Paper substrate ignited These formulations are capable of producing a much more controllable and uniform heater than those compositions of Examples 1 and 2 representative of prior art. Under the test conditions, it is evident that heater responses with a 200 g. water load in excess of 300° F. can be obtained without the coated sheet igniting when exposed to microwave heating with no load present. It has been consistently observed that heaters produced in accordance with our invention with a mixture of carbon black, aluminum flake and clay provide a much more uniform heater than those of Examples 1 and 2. When observed with the Hughes I.R. video system, the entire coated surface tends to heat nearly uniformly at the same rate and to nearly the same temperatures.

The data from Table III at coating weights of 3.9 (Curve A), 5.0 (Curve B), and 6.7 (Curve C) pounds per ream (3000 sq. ft.) are illustrated graphically in FIG. 1, which illustrates the heating characteristics of heaters produced according to a preferred embodiment of this invention.

EXAMPLE 4

A composition was made up containing 24 weight percent carbon black (Huber, Arosperse 47), 35 weight percent aluminum flake (Obron, Hydrolac W60) and 41 weight percent binder composed of 1 part Lucidene 602 and 2 parts Rhoplex B-15. Paper test sheets coated with this composition were tested as in Example 1 with the results shown in Table IV.

TABLE IV

|  | Coat Wt. lb/rm | | Heater Response in Degrees F. | | | | |
| --- | --- | --- | --- | --- | --- | --- | --- |
|  | Total | Active[2] | 20 sec | 40 sec | 60 sec | 90 sec | 130 sec |
| No Load | 3.5 | 2.1 | 437 | 456 | 456 | 470 | 500 |
|  | 4.4 | 2.6 | 515 | ign[1] | — | — | — |
| With Load | 3.5 | 2.1 | 220 | 280 | 296 | 296 | 296 |
|  | 4.4 | 2.6 | 300 | 375 | 406 | 398 | 422 |

[1] Paper substrate ignited
[2] Active ingredients in coating, i.e. carbon black and aluminum flake These compositions, while performing somewhat better than those made up of only aluminum flake and binder (Example 2) are less desirable as heating elements than the compositions of Example 3 in that it is difficult to control their performance under both load and no load conditions within acceptable temperature limits.

EXAMPLE 5

A composition was made up of 35 weight percent carbon black (Huber Arosperse 47); 35 percent clay (Georgia kaolin, Premier No. 1 Grade) and 30 percent binder (Lucidene 602). Paper test sheets coated with this composition were tested as in Example 1 with the results reported in Table V.

TABLE V

|  | Coat Wt. lb/rm | | Heater Response in Degrees F. | | | | |
| --- | --- | --- | --- | --- | --- | --- | --- |
|  | Total | Active[1] | 20 sec | 40 sec | 60 sec | 90 sec | 130 sec |
| No Load | 2.8 | 0.98 | 185 | 204 | 219 | 234 | 250 |
|  | 5.0 | 1.75 | 428 | ign[2] | — | — | — |
| With Load | 2.8 | 0.98 | 159 | 190 | 204 | 219 | 234 |
|  | 5.0 | 1.75 | 293 | 347 | 369 | 369 | 369 |

[1] Active ingredients in coating, i.e. carbon black
[2] Paper substrate ignited Comparison of the test results obtained in this example with those of Example 1 indicates that the addition of a temperature moderator, in this case clay, has little effect on heater response temperature when carbon black is the sole microwave reactive component of the composition.

EXAMPLE 6

A composition similar to that of Example 3 was prepared with 19 weight percent carbon black, 27 weight percent aluminum flake, 18 percent kaolin, and 34 weight percent binder from a 1:2 mixture of Lucidene 602 and Rhoplex B-15.

Figure 2:
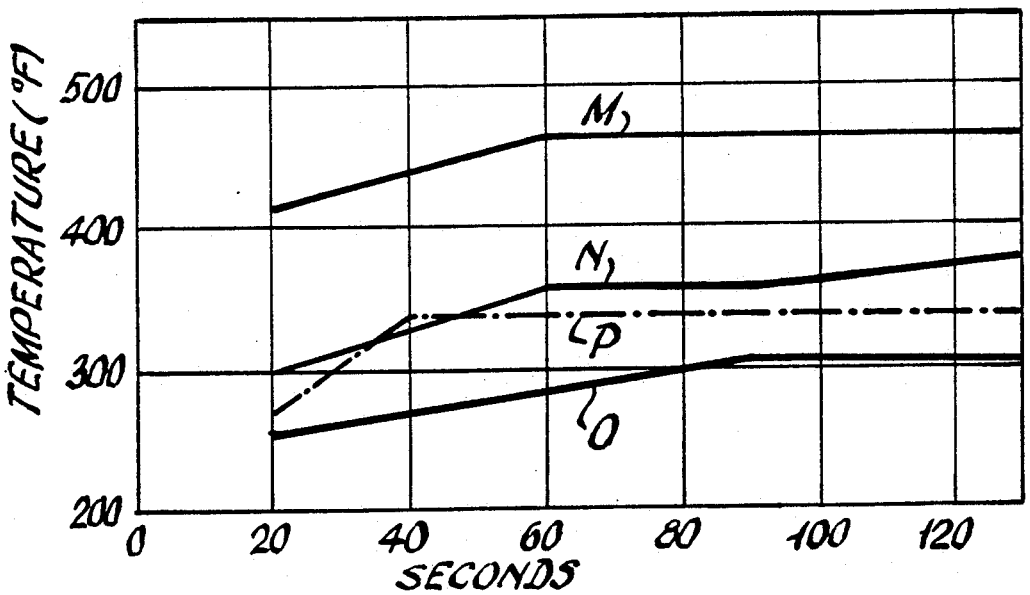
FIG. 2 of the drawing illustrates graphically the performance of heating elements produced from our preferred compositions by printing the coating onto paper with a rotogravure printing process as compared with a heater produced by conventional vapor deposition of aluminum on polyester film and laminated to paper or paperboard.

The solids, viscosity and surface tension of the formulation was adjusted by the addition of water, alcohol and carboxymethyl cellulose as necessary for excellent runnability on a full scale gravure printing press at 250 ft/min. With reference to FIG. 2 of the drawings, test specimens were prepared by rotogravure printing and identified as follows.

| Specimen | Printing Apparatus | Coating Weight lb./3000 sq ft |
| --- | --- | --- |
| M | 85 line screen gravure cylinder | 4.5 |
| N | 100 line screen gravure cylinder | 4.0 |
| O | 135 line screen gravure cylinder | 2.2 |

A metallized film/paper laminate from a commercial popcorn package (Specimen P) was taken as a basis for comparison. The specimens were tested under no load conditions in the microwave oven as in Example 1. The results plotted in FIG. 2 clearly show that under these conditions, coat weights of 4 to 4.5 lb/3000 sq. ft. gave heating response equal to or superior to a commercial metallized film when tested in a microwave oven.

The foregoing examples illustrate the unexpected advantages of the microwave interactive coating compositions of this invention as compared with those of the prior art and other two component pigment compositions containing finely divided metal or finely divided carbon as the active ingredient.

We claim:

1. A microwave interactive coating composition consisting essentially of finely divided carbon, a finely divided microwave reactive metal selected from the group consisting of aluminum, tin, bronze and nickel, a powdered inert solid material selected from the group consisting of alumina hydrate, silica, titanium oxides, aluminosilicates, clay, and calcium carbonate, and an acrylic latex binder dispersed in an aqueous carrier wherein the weight ratio of metal to carbon in the composition is in the range of from about 0.2 to about 2 parts metal per part carbon, the powdered inert solids comprise 10 to 35 weight percent of the total solids in the composition and the binder solids comprise 30 to 40 weight percent of the total solids.

2. A microwave interactive coating composition as defined in claim 1 wherein the finely divided carbon is graphite.

3. A microwave interactive coating composition as defined in claim 1 wherein the finely divided carbon is carbon black.

4. A microwave interactive coating composition as defined in claim 1 wherein the metal is aluminum flake.

5. A microwave interactive coating composition consisting of finely divided carbon, aluminum flake, clay, and an acrylic latex binder dispersed in an aqueous carrier wherein the weight ratio of aluminum to carbon in the composition is in the range of from about 0.2 to about 2 parts aluminum per part carbon, the powdered inert solids comprise 10 to 35 weight percent of the total solids in the composition and the binder solids comprise 30 to 40 weight percent of the total solids.

* * * * *